July 31, 1934.   W. K. EDWARDS   1,968,131
LIQUID SEPARATING DEVICE
Filed Aug. 31, 1933
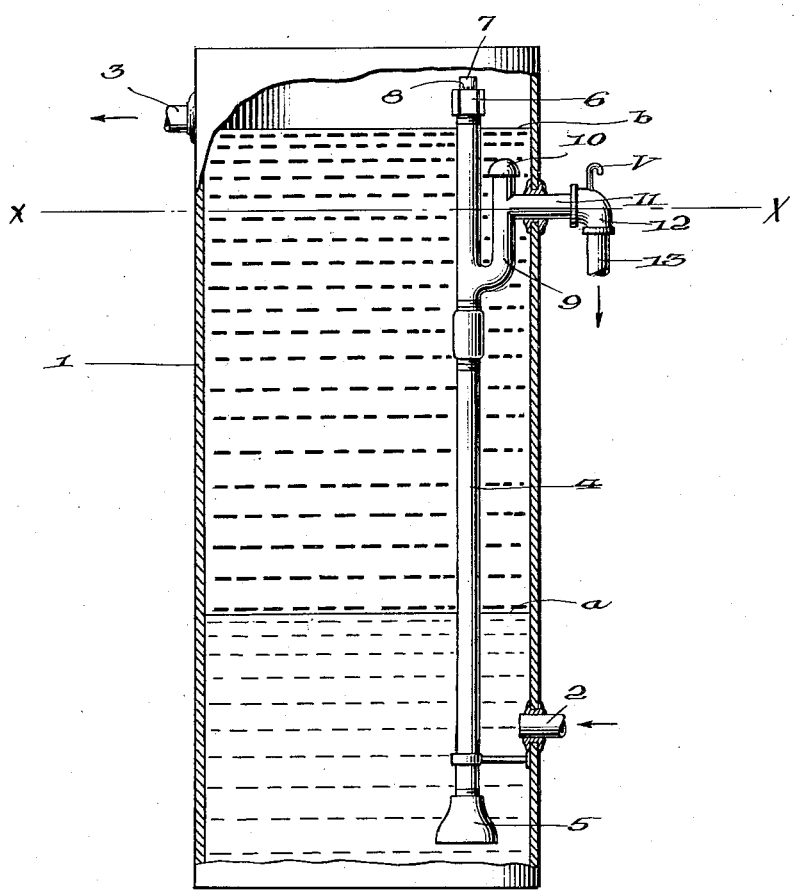
Inventor
William K. Edwards,
By
Mason & Mason   Attorneys Patented July 31, 1934

1,968,131

UNITED STATES PATENT OFFICE 1,968,131

LIQUID SEPARATING DEVICE

William K. Edwards, Big Spring, Tex.

Application August 31, 1933, Serial No. 687,676

4 Claims. (Cl. 210—51)

This invention relates to liquid separators, and more particularly to a device for separating a heavier from a lighter liquid, such as water from oil.

An important object of the invention is to provide a device of the class referred to in which the separation of water from oil is automatically and continuously effected, and wherein the device requires no attention whatever on the part of the operator but will discharge its functions indefinitely without repairs, or disturbance.

One of the objects of the invention is to provide a separating device which may be located in an oil supply line, and is so constructed and arranged as to its operative parts that the possibility of any of the separated water being discharged with the oil is avoided.

Another object of the invention is to provide a device of the character referred to which may be used in a closed tank, the columns of oil and of water in such tank being maintained in a state of equilibrium, and the escape of gases which pass off from the oil back through the water discharge element prevented. This is a very desirable feature of the invention as it enables such gases to be conserved, instead of going to waste.

Other objects and purposes of the invention will be more apparent from the following description, in connection with the accompanying drawing illustrating one embodiment of the invention.

Referring to the drawing, the numeral 1 indicates a closed tank, having an inlet connection 2 for oil, or other liquids, as for example, oil which is unpurified and contains a certain amount of water. The numeral 3 indicates a discharge pipe for oil which has been purified, or relieved of water through the action of the apparatus. The tank 1 contains a vertical pipe 4, which is suspended therein, as shown, having an expanded or bell-shaped inlet 5 located near the bottom of the tank, and its upper end portion closed by a cap 6, provided with an extension 7 containing perforations 8. A trap 9 consisting of a lateral branch pipe is connected near the upper portion of the pipe 4, and terminates in a cap 10. A branch pipe 11 connects with the trap 9 and passes horizontally through the wall of the tank, being herein shown as provided with an elbow 12 to which is connected a discharge 13 for the separated water. A vent connection V is applied to some portion of the outlet conduit 11, as to the elbow 12, to prevent the undesirable emptying of the tank through syphonic action. The line x—x on the drawing indicates the approximate discharge level of the water and the distance between this line and the level b of the oil indicates the difference in height of the two balanced hydrostatic columns.

As shown in the drawing, the water level in the tank 1 may be at or about the line a, while the oil level is along the line b, and corresponds with the overflow level determined by the discharge pipe 3. The space shown between the top of the tank and the oil level b is occupied by gas which passes off from the oil, and exerts a pressure upon the liquid in the tank 1. The escape of such gas into the discharge pipe 13 is prevented by the water which is contained in the trap 9. This is a desirable result, as it enables the accumulated gas in the top of the tank to be discharged through the pipe 3, and utilized as a by-product, instead of being wasted as would be the case except for the presence of the trap 9. This is very important, as the accumulation of gas above the liquid in the tank is continuous during the operation of the apparatus, and the conservation of this gas results in a considerable economy by saving it for various uses.

The operation of the apparatus will be clear from the foregoing description. The oil, containing more or less water, is admitted through the inlet pipe 2 and by reason of its greater specific gravity such water accumulates in the bottom portion of the tank at or about a level, such as indicated by the line a, while the oil rises above this water and accumulates in a column whose level is determined by the outlet pipe 3, and indicated by the line b. The hydrostatic pressure due to the column of oil, plus the pressure of gas which accumulates at the top of the oil, is opposed by such pressure, plus the weight of the column of water in the pipe 4, and these two columns substantially maintain their relative positions, as shown in the drawing, and become balanced. The differential levels of the oil and water are controlled, more or less, by the gravity of the oil used in the apparatus, it being apparent that with a lighter gravity oil the line a indicating the water level would be at a higher point in the tank than that indicated. When the accumulation of water is such that the water rises in the pipe 4 sufficiently high to pass out through the pipe 11, such water will be discharged. Accumulation of the oil will continue until it reaches the level of the lower portion of the discharge pipe 3, whereupon the oil on top of the water will be drawn off, and these operations will continue indefinitely and automatically, with such fluctuations in the relative levels of the oil and water in the tank as will occur due to the proportions of these two liquids in the mixture which is admitted through the pipe 2, but in no case will the level of the oil fall sufficiently low for the oil to pass out of the discharge pipe 4 and go to waste, as the counterbalanced columns of liquid will prevent this, just as long as there is any water contained in the oil which is admitted through the pipe 2.

It is a feature of importance of this invention that the inlet for the oil and water is at the bottom portion of the tank, while the outlets for the separated oil and water are located at the upper portion of the tank, as this prevents the unnecessary accumulation of air, and permits the two liquids to arrange themselves in accordance with their specific gravities without undue disturbance. The operation will thus be smooth, silent and continuous.

The pressure of gas in the upper part of the tank will be applied equally to the two columns of liquid through its contact with the surface of the oil, and through the apertures 8 upon the column of water in the stand pipe 4, so that the two columns of liquid are under the same gas pressure in the closed tank, and their hydrostatic pressures, due to their differences in gravity, are not affected in the balancing operation of the two columns. It is apparent also that variations in the height of the two columns, due to differences in the relative quantities of the two liquids during use, may occur within wide limits, and at the same time there will always be a sufficient amount of water in the bottom of the tank to seal the lower end portion of the pipe 4 against entrance of the oil and its consequent loss. It is also apparent that the escape of the gas from the upper end of the tank by reason of the presence of the trap 9, is prevented, while the pressure of such gas upon the water column in the pipe 4 is permitted in order to counterbalance its pressure upon the volume of oil in the upper portion of the tank. By reason of the simplicity of the parts of the apparatus employed, it will be apparent that the danger of clogging and interference with the regular operation of the device is reduced to a minimum, and therefore, the apparatus may be employed in various relations where it is desirable to "bleed" a body of oil of the water present in such body.

I claim:—

1. In a separator of the class described, the combination of a closed tank adapted to contain liquids of different specific gravities, means for admitting the liquids to the tank below the level normally assumed by the heavier liquid after separation from the lighter liquid, a stand pipe within the tank having its lower end located near the bottom portion of the tank and below the level of the heavier liquid and having its upper end adapted to extend normally above the level of the lighter liquid and provided with an aperture to admit gas accumulating in the top portion of the tank, a conduit for discharge of the heavier liquid connected with said stand pipe and passing through the wall of said tank, gas sealing means between the gas admission means and said liquid discharge conduit, and discharge means in the upper portion of the tank for the lighter liquid arranged to permit the overflow of said liquid at a point beneath the top portion of the tank whereby a space for gas is provided between the level of said liquid and the top of the tank.

2. In a separator of the class described, the combination with a tank adapted to contain a mixture of oil and water, of a standpipe located vertically in said tank and having its inlet arranged near the bottom portion of said tank and its upper portion terminating in vent openings located near the top of the tank and above the liquid therein, a lateral branch pipe communicating at its lower end with said standpipe at a point below the upper termination of the latter, said branch pipe being arranged substantially parallel with said standpipe and provided at its upper end with a closure, and arranged to form a trap to prevent the escape of gas from the upper portion of the tank, a pipe leading laterally from said branch pipe through the wall of the tank and adapted to discharge water from the tank, and an oil discharge located near the upper portion of the tank.

3. In a separator of the class described, the combination with a tank having a closed top and adapted to contain a mixture of oil and water, of a standpipe located vertically in said tank and having its inlet arranged near the bottom portion of the tank, a gas trap near the upper portion of said standpipe, a water discharge conduit connected with the outlet of said trap and extending through the side of the tank, said standpipe having an upward extension terminating in the gas space above the oil in said tank and provided with a vent opening for preventing syphonic action in said standpipe, said gas trap being located between said vent and water discharge so as to prevent the gas from the top of the tank from entering the water discharge pipe.

4. A separating apparatus of the type described comprising, in combination, a closed tank provided at its lower portion with an inlet for oil and water, and near its upper portion with an outlet for oil, said tank arranged to contain water with a layer of oil floating thereon, a vertically disposed standpipe in said tank having its lower portion located near the bottom of the tank, and its upper portion located above the oil level and provided with a vent opening, a gas trap connected with the upper portion of said standpipe, a water discharge pipe connected with the outlet of said gas trap and extending through the side of the tank, said trap being located between said vent opening and water discharge pipe to prevent the escape of gas into the latter, and said vent being arranged to prevent syphonic action through said trap and water discharge pipe.

WILLIAM K. EDWARDS.